United States Patent [19]

Yamamoto et al.

[11] Patent Number: 4,793,220
[45] Date of Patent: Dec. 27, 1988

[54] METHOD OF MAKING A DRILL-SHAPED CUTTING TOOL AND THREAD ROLLING DIES

[75] Inventors: Fukuzo Yamamoto; Yoshiaki Aoya; Hisayoshi Yamamoto, all of Kawachinagano, Japan

[73] Assignee: Kabushiki Kaisha Yamamoto, Osaka, Japan

[21] Appl. No.: 874,180

[22] PCT Filed: Nov. 2, 1985

[86] PCT No.: PCT/JP85/00610
§ 371 Date: Jun. 3, 1986
§ 102(e) Date: Jun. 3, 1986

[87] PCT Pub. No.: WO86/02867
PCT Pub. Date: May 22, 1986

[30] Foreign Application Priority Data

Nov. 5, 1984 [JP] Japan .................................. 59-234000

[51] Int. Cl.$^4$ ................................................ B21K 5/20
[52] U.S. Cl. ................................. 76/108 R; 76/107 R; 219/69 M; 219/69 V
[58] Field of Search ............. 76/101 R, 107 R, 108 R; 72/88, 90, 469; 219/69 M, 69 V, 69 R

[56] References Cited

U.S. PATENT DOCUMENTS

| | | | |
|---|---|---|---|
| 3,561,297 | 2/1971 | Wilkins | 76/107 R |
| 3,828,604 | 8/1974 | Shelton | 72/469 |
| 4,631,947 | 12/1986 | Corrette | 76/107 R |

FOREIGN PATENT DOCUMENTS

| | | | |
|---|---|---|---|
| 139841 | 10/1981 | Japan | 76/107 R |
| 184635 | 11/1982 | Japan . | |
| 491710 | 9/1938 | United Kingdom | 76/107 R |

Primary Examiner—Roscoe V. Parker
Attorney, Agent, or Firm—Birch, Stewart, Kolasch & Birch

[57] ABSTRACT

A method of making the drill-shaped cutting tool and its thread rolling die by which the workpiece such as the wire rod is rolled. The thread rolling die has a majority of uneven parts for forming the drill part formed by an electric discharge. The electrode for electric discharge machining is equipped with a pair to undergo the electric discharge and is formed to be approximately drill-shaped by forming the groove like uneven parts at least on the approximately cylindrical body possessing the diameter approximately equal to that of the drill part of the cutting tool to be made, and is then rotated and moved in parallel with the thread rolling die.

7 Claims, 6 Drawing Sheets

METHOD OF MAKING A DRILL-SHAPED CUTTING TOOL AND THREAD ROLLING DIES

BACKGROUND OF THE INVENTION

1. Field of the Invention

The present invention relates to a method of making a drill-shaped cutting tool and thread rolling dies for the same. The drill-shaped cutting tool includes a drill and a self-drilling screw. This tool can make a cylindrical hole or the like on a workpiece by means of rotation thereof.

2. Description of the Background Art

Today, many drills are made by various methods. For instance, striking one of a pair of dies against another may permit the tip of many self-drilling screws to be fabricated into the drill shape.

Nevertheless, in order to perform the foregoing grinding process of the material, various types of processes are needed. Although the process for machining the tip of the screw into the drill-shape by means of striking a die against another may suffice, the fabrication of the threaded part needs another simplified process.

SUMMARY OF THE INVENTION

The present invention provides a method of making a cutting tool characterized in that a majority of uneven parts which are formed on a plane where the drill-shaped cutting tool is rolled are made on the dies and said dies are in a position to roll the drill-shaped cutting tool.

The present invention is further concerned with the dies in use for the foregoing method, on which a majority of uneven parts are formed on the plane when the drill-shaped cutting tool is rolled on the plane.

The method of making the drill-shaped cutting tool according to the present invention lies in an arrangement in which an electrode (106) is formed for electric discharge machining which is equipeed with a part to undergo the electric discharge. The electrode is formed to be approximately in a drill-shape by means of fabricating the groove like uneven parts at least partially on an approximately cylindrical body (101) possessing a diameter which is approximately equal to that of the drilling part of the drill-shaped cutting tool to be manufactured. The electric discharge is made while the electrode (106) is rotated and moved parallel with the thread rolling die (201) which causes a majority of uneven parts (207) and (208) to be formed on the thread rolling die. The thread rolling dies are in a position to roll the workpiece such as a wire rod and the like. Such a method allows the drill-shaped cutting tool to be made in one step.

On the other hand, the thread rolling die according to the present invention, which is used for the foregoing method, has a majority of the uneven parts (207) and (208) formed in such a way that by moving the electrode (106) for the electric discharge machining parallel to the die while rotating this electrode (106) will permit the uneven parts to be correspondingly transferred to the electrode (106). The part to undergo the electric discharge is formed to be approximately drill-shape by means of fabricating the groove like uneven parts at least partially on the approximately cylindrical body (101) possessing the diameter approximately equal to that of the drilling part of the drill-shaped cutting tool to be manufactured. The rolling by these thread rolling die machines allows the material to be drill-shape.

Furthermore, as for the self-drilling screw, at the same time when a thread ridge is formed by the rolling, the tip of the screw can be machined to be drill-shape.

Further scope of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A description of the embodiment according to the present invention is made in conjunction with the accompanying drawings which are given by way of illustration only, and thus are not limitative of the present invention, and wherein.

DETAILED DESCRIPTION OF THE PREFERRED EMBODIMENTS

Figure 6:
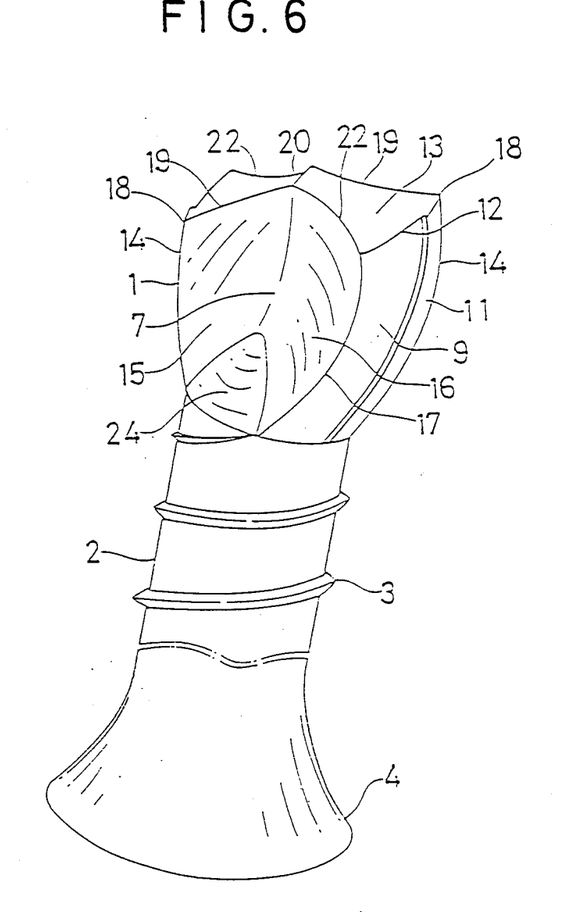
FIG. 6 is an enlarged perspective view of the self-drilling screw.

The self-drilling screw as shown in FIG. 6 is one embodiment of the cutting tool. The tip end of the screw includes a drill-shaped cutting part (1). A screw part (3) on the middle area of a shaft part (2) is also provided. The shaft part (2) is equipped with a head part (4) on an end thereof. This head part (4) is driven by a tool which imparts a rotational torque to the screw.

This self-drilling screw is, as generally known, made by means of machining a wire rod. When machining such a wire rod, according to the present invention, a pair of thread rolling dies enable the fabrication of the screw part (3) and the cutting part (1) to be attained in one step. Other machining processes of the wire rod, e.g. the fabricating machining and the surface processing of the head part, employ conventional methods. Along with having the wire rod cut in the predetermined dimension, the head part is formed out of the blank before the process of machining the shaft part and the cutting part of the tip end.

At that time, one acceptable option may be the preparatory machining of the shaft part such as tapering the tip end of the shaft end and the like.

In addition to the part for machining the thread ridge of the ordinary shaft part, the foregoing thread rolling die possesses the part for machining the cutting part of the tip end. This machining of the cutting part of the tip end is performed by the electric discharge machining for which the tool (electrode) is used. The tip end of the tool (electrode) has the drill-shape. For this reason, a description is made of the manufacturing of the electrode, the electric discharge machining of the die and the rolling of the screw as set forth below.

The electrode is made by means of grinding the cylindrical electrode material into a drill-shape as desired. Copper, graphite, and the like may be used as the electrode material, and the present embodiment is particularly adapted to a copper tungsten material in terms of the advantageousness for grinding.

Figure 2:
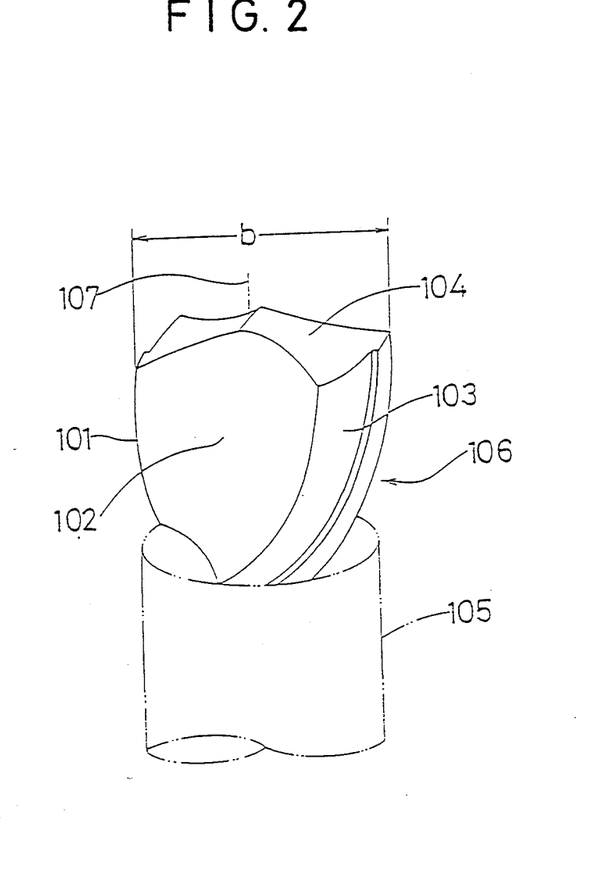
FIG. 2 is an enlarged perspective view of the electrode (tool)

The electrode material is ground into the cylindrical shape possessing a predetermined diameter (approximately equal to that of the cutting part (1) on the tip end of a finished self-drilling screw). Subsequently, a method identical to that for making the drill allows a groove (102) and a land (103) of the body (101) to be ground, finally followed by grinding the tip end part (104). In the present embodiment, a point angle and second roughing angle are set to 110° and 30°, the land (103) also being relieved. The body (101) may be entirely ground into a drill-shape. A further acceptable option is possible in which the only part necessary for the electric discharge machining is ground into the drill-shape, whereas the other part is adapted to be of the cylindrical part (105). At that time, it is acceptable to make the diameter of the cylindrical part smaller than that of the drill of the body (101).

Figure 3:
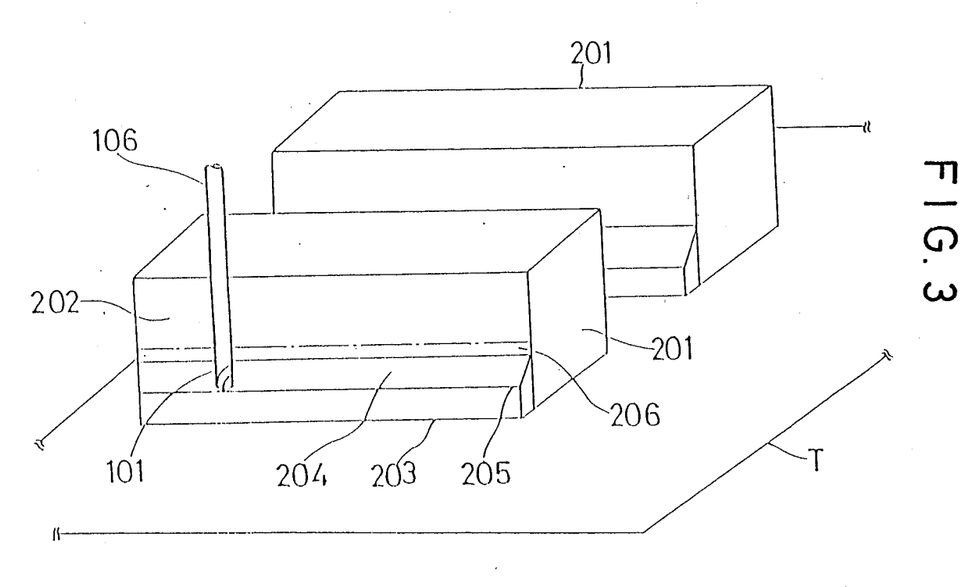
FIG. 3 is an explanatory view of the electric discharge machining.
Figure 4:
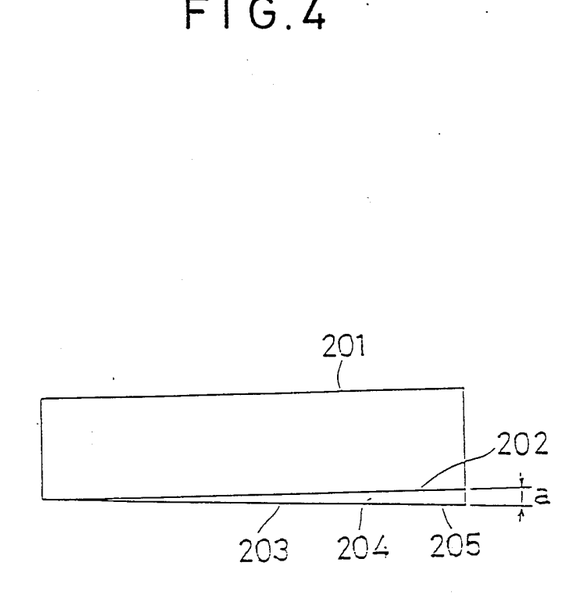
FIG. 4 is a plan view of the die.

Next, the electric discharge machining of the die is performed as indicated in FIGS. 2 and 3 by utilizing the foregoing tool (electrode) (106). The electrode (106) is mounted to the lower end of a servo head of an electric discharge machine. On the other hand, one set of dies (201) and (201) are put on a work table (T). These dies cause the predetermined lead angle to have a majority of long grooves (not shown) for forming the thread ridge formed on the upper flat surface (202). These long grooves are similar to those of flat die for rolling the ordinary thread ridge, and are formed by the same method. It is acceptable to form the long grooves after the electric discharge machining. A bank part (203) projects from the lower part of the die (201). The bank part (203), as shown in FIG. 4, makes an angle (a) to the flat surface (202), taken from a plan plane, and is gradually extruded proportionally and progressing from the left of the die to the right. The angle (a) is 3°–5°. The bank part (203) possesses an inclined surface (204) followed by the flat surface (202). The bank part (203) further posses a top (205).

The machining for fabricating the drilling part is performed by the electrode (106) on the lower part of the flat surface (206), the lower part of the inclined surface (204) and the flat surface (202). The electrode (106) is moved in parallel with the flat surface (202), while being rotated from the left of the die (201) to the right. It is self-explanatory that the electric discharge is performed by way of a fine gap such as 0.01–0.1 mm in dielectric liquid. A lateral moving length of the electrode made during one rotation thereof is approximately equal to the circumferential length of the drill diameter (b) of the electrode. The electric discharge machining is performed until the central axis (107) of the electrode (106) reaches the position at the right end of the die (201). The present embodiment tentatively adapts the gimlet angle of the foregoing inclined surface (204) to be 20°, such an angle being able to be adequately changed.

Figure 1:
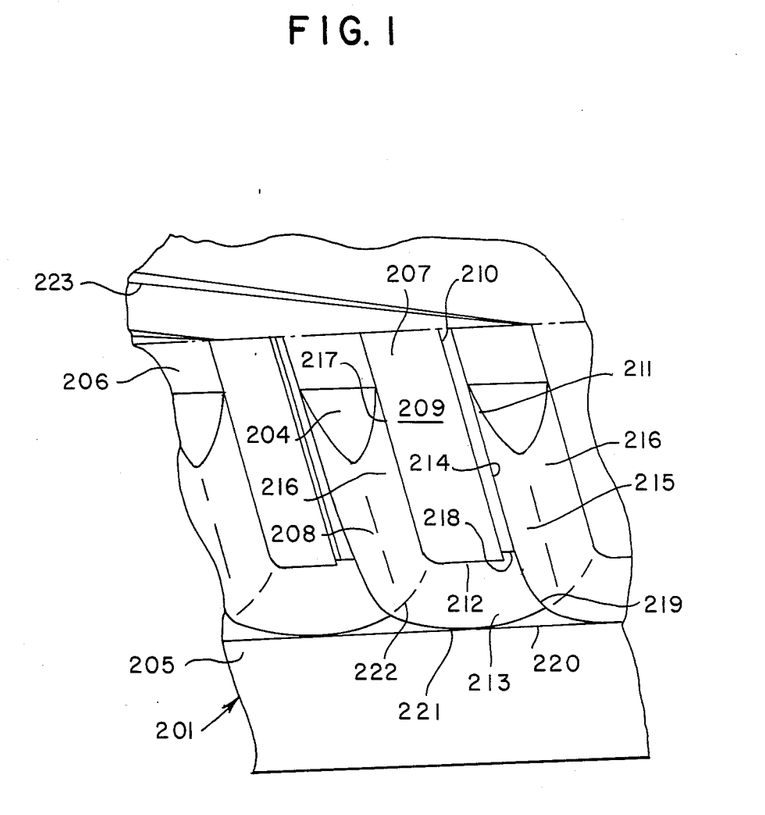
FIG. 1 is an enlarged perspective view of the die.
Figure 5:
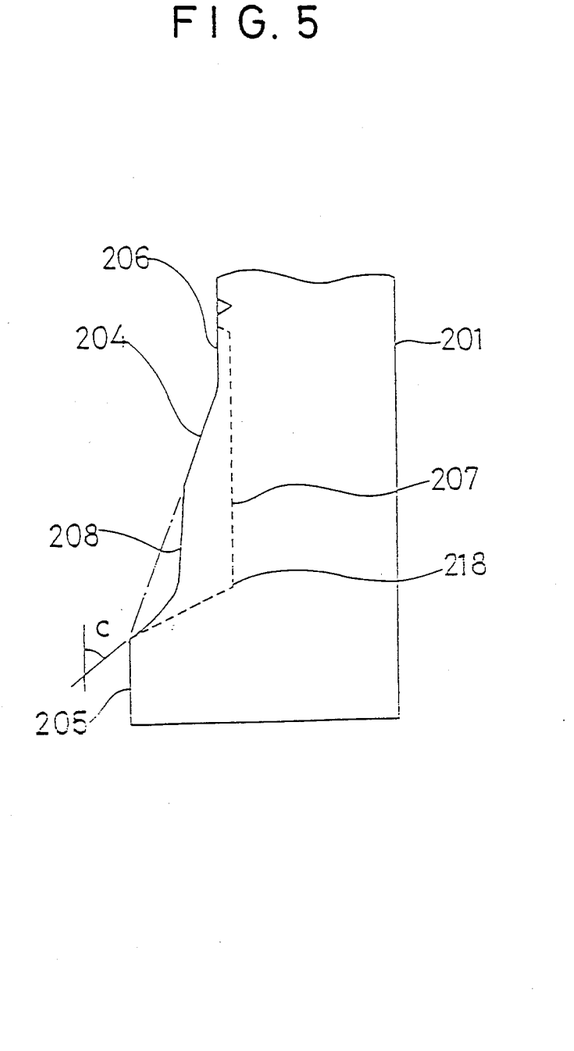
FIG. 5 is an enlarged side view of the die.

Referring to FIGS. 1, 5 and 6, a majority of uneven parts are formed when the drill-shaped electrode (106) is moved, while being rotated on the plane, and these uneven parts are formed on the inclined surface (204) and the lower flat surface (206) of the die during the electric discharge machining. The concave part (207) corresponds to the land (103) and the convex part (208) corresponds to the groove (102). A definite boundary between the concave part (207) and the convex part (208) is not needed because they are relative to each other. Since the electrode (106) is moved parallel to the flat surface as previously mentioned, a depth of the concave part (207) into the flat surface (202) is constant from the right to the left of the die, but the bank part (203) is considerably projected closer to the right than the left of the die (201). The nearer to the right of the die (201), the greater the difference is between the concave part (207) and the convex part (208).

FIG. 1 is a perspective view of the details of the concave part (207) and the convex part (208). The concave part (207) comprises a part to form the land (209) and a part to form a margin (211) which is deeper than the land (209) with a difference in step (210) taking place between them. In that case, it is not always necessary to connect both the parts (209) and (211) by a difference in step (210) to each other. A depth is gradually increased proportionally to the progressing from the land (209) to the margin (211). Both of the parts (209) and (211) are followed by way of a boundary (212) by a part to be steeply inclined up part (213). The part to form the margin (211) is followed by way of a part to form the cutting edge (214) by a part to form the cutting surface (215) on the convex part (208). After the part to form the cutting surface (215) makes a gradual ascent, it is followed by a part to form a drag surface (216), which subsequently makes a descent. The part to form the drag surface (216) is followed by way of a boundary part against the land (217) by the part to form the land (209). Since the boundary (212) imparts the second roughing angle to the drill-shape of the cutting part (1) of the self-drilling screw which is to be rolled by the die (202), in proportion to its progressing from the part to form the margin (211) to the part to form the land (209), it makes a gradual access to the upper part of the die (201). A point of contact (218) at which three parts including the part to form the margin (211), the steeply inclined part (213), and the part to form the cutting surface (215) are intersected one to another and constitute a shoulder (18) of the cutting part of the screw. The steeply inclined part (213) is approximately fan shaped and possesses an elevating angle (C) of about 50°. This steeply inclined part (213), which forms the tapered part (13) of the screw's cutting part, causes its boundary line (219) against the part to form the cutting surface (215) to form a cutting edge on the tip (19). The fan edge part (220) of the steeply inclined part (213) forms a chisel point (20) of the screw's cutting part (1). A fine gap (221) exists between the fan edge part (20) and the top (205). The inclined part (204) is left as a blank on the upper part of the convex part (208) in the die. Since the more definite boundary parts appear as lines and points, the more acute the boundary taking place at the cutting part (1) becomes. Therefore, a simple adjustment of a degree in processing may meet requirements as necessary. For example, since the boundary line (219) forms the cutting line on the tip (19), it is preferable that the boundary line (219) appears as a definite line. There is no necessity that the boundary line (222) between the steeply inclined part (213) and the part to form the land (216) appears as a line. The long groove (223) constituting the screw part (3) is formed on the flat surface (202).

The die (201) employing such a construction allows the foregoing wire rod to be rolled. The method of performing the pertinent rolling is identical to that of making the screw by the common flat die.

The aforementioned rolling allows the self-drilling screw as shown in FIG. 6 to be obtained.

The cutting part (1) of the screw possesses the groove (7) running spirally in a longitudinal direction, the land (9) and the margin (11). The groove (7) is formed by the convex part (208) of the die, the land (9) is formed by the part to form the land (209) of the concave part, and the margin (11) is formed by the part to form the margin of the concave part.

The tip (19) of the cutting edge, the point angle of which is set to 110°, is formed on the edge of the tapered surface (13) on the tip end of the cutting part (1), and the tapered surface (13) is formed by the part to form the taper of the die. The second roughing angle of the tapered surface is about 30° and is in proportion to the progressing tapered surface (13) of the shoulder (12) from the margin (11) to the land (9), as the shoulder (12) gets gradually farther from the tip end toward the base part. Such a construction is attained by the arrangement in which the boundary (212) of the die away from the contact point (218) of the die is inclined such that it is directed toward the upper part of the die.

The land (9) is relieved from the margin (11) based on the difference in step (210) of the die. The margin (11) is followed by the cutting surface (15) of the groove (7) with the cutting edge (14) as a boundary, and the cutting surface (15), getting curved, is followed by the drag part (16). The drag part (16) is connected by way of the boundary part (17) to the land (9). The boundary line (219) of the die forms the cutting edge on the tip (19) located on the edge of the tapered surface (13) on the tip end. The boundary area (222) forms the boundary area (22) between the tapered surface (13) and the drag part (16).

The chisel point (20) is formed on the tip end of the cutting part (1). In order to form the chisel point in a line, it is preferable that the fan shaped part (220) draws a fine circular arc.

An approximately taper-shaped projection (24) is formed as a connection part between the drill-shaped cutting part (1) and the shaft part (2) on the base part of the groove (7). Since the projection (24) is formed on the inclined surface (204), it has a taper angle of about 30°. The point angle of the tapered surface (13), which is formed by the steeply inclined surface (213) having an elevation angle of about 55°, becomes 110°.

The self-drilling screw having such a construction permits its drill-shaped cutting part (1) to make a prepared hole, while being screwed to the tool by the screw part (3). It is possible to change, if necessary, the drill diameter of the cutting part (1), the diameter of the shaft (2), and the diameter of the thread ridge of the screw part (3). The tip end of the thread ridge may begin at the inside of the cutting part (1), or it may begin at a position considerably distant from the cutting part (1).

In addition to making the foregoing described self-drilling screw, the present invention may be effected also as a drill. In that case, the concave part (207) and the convex part (208) employ an irregular strip which extends from the lower part of the die to the upper part thereof, and are lined in parallel with each other under the predetermined lead angle. The aforementioned embodiment uses two grooves (7), but it is possible to increase this number.

The need for forming the bank part (203) in advance is not always necessary when performing the electric discharge machining of the die, and it is acceptable to rely entirely upon the fabrication by the electric discharge machining. Furthermore, in order to clear up the shape of the die which has undergone the electric discharge machining, the grinding machining may be further performed.

The drill-shaped form to be fabricated is not always limited only to the twist-drill-shape, and a modified drill-shape may also be acceptable.

Thus, according to the present invention, at the same time when the rolling enables the drill-shaped cutting tool to be made only with one process, even the embodiment as the self-drilling screw may fabricate the cutting part and the screw part at the same time so that the manufacturing process is simplified.

In summary, the method and its thread rolling die according to the present invention may be applied to the manufacturing of the self-drilling screw and the like which is equipped with a cutting element on the tip end of the drill-shaped cutting tool. This manufacturing process may easily be carried out in simply one step.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of making a drill-shaped cutting tool which comprises:
   making an electrode for electric discharge machining, said electrode having an end part which is to be treated;
   electrically discharging and rotating said electrode while moving said electrode parallel to a thread rolling die whereby uneven parts are formed on said end part by the thread rolling die; and
   rolling said end part by said thread rolling die to form a drill-shaped part of said drill-shaped cutting tool.

2. The method of making the drill-shaped cutting tool as defined in claim 1 wherein a part of the electrode which undergoes the electric discharge is equipped with uneven parts which are similar to the shape of a cutting groove of a drill part and land, respectively, of the drill-shaped cutting tool.

3. The method of making a drill-shaped cutting tool as defined in claim 1 wherein a bank part possessing an inclined part is projectingly formed on the lower part of the thread rolling die, and a majority of uneven parts for forming the drill part are formed at least one the inclined part.

4. A method of making a thread rolling die, comprising rotating while electrically discharging and moving in parallel with a thread rolling die an electrode for electric discharge machining having a part which undergoes the electric discharge approximately drill-shaped by forming groove like uneven parts at least partially on an approximately cylindrical body of the electrode possessing a diameter approximately equal to that of a drill part of the drill-shaped cutting tool to be made, thereby forming a majority of uneven parts on said thread rolling die.

5. A thread rolling die having an upper part, a lower part, a bank part, a flat part, and an inclined part, wherein:
   the bank part is formed projectingly from said lower part in which said bank part forms an angle of 3° to 5° with the flat part and is gradually extended proportionally and progressing from the left of the die to the right of the die;

a portion of the die for forming uneven parts includes an inclined surface, a lower part of a flat surface, a concave part corresponding to the land of a thread and a convex part corresponding to a groove of a thread, wherein the depth of the concave part into the flat surface is constant, said concave part further including a part for forming a margin which is deeper than the portion of said concave part which corresponds to the land of a thread;

a part for forming a cutting edge projecting upwardly and contiguous with said part for forming said margin;

a part for forming a drag surface which is contiguous with said cutting edge and projects downwardly toward said concave part corresponding to the land of a thread;

a majority of grooves for forming a thread ridge being formed on the upper part of the die, and a majority of uneven parts for forming the drill part being formed on the lower part of the die; and means for forming a cutting edge on a tip of a drill-shaped cutting tool.

6. The thread rolling die as defined in claim 5 wherein a majority of grooves for forming a thread ridge are formed on the upper part of the die, and a majority of uneven parts for forming the drill part are formed on the lower part of the die.

7. The thread rolling die as defined in claim 5, wherein a bank part possessing an inclined part is projectingly formed on a lower part of the thread rolling die, and a majority of uneven parts for forming the drill part are formed at least on the inclined part.

* * * * *